United States Patent
Dawkins

(10) Patent No.: US 9,703,714 B2
(45) Date of Patent: *Jul. 11, 2017

(54) SYSTEM AND METHOD FOR MANAGEMENT OF CACHE CONFIGURATION

(71) Applicant: Dell Products L.P., Round Rock, TX (US)

(72) Inventor: William Price Dawkins, Jonestown, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/729,878

(22) Filed: Jun. 3, 2015

(65) Prior Publication Data

US 2016/0357675 A1 Dec. 8, 2016

(51) Int. Cl.
*G06F 12/08* (2016.01)
*G06F 12/0831* (2016.01)
*G06F 12/0877* (2016.01)

(52) U.S. Cl.
CPC ...... *G06F 12/0835* (2013.01); *G06F 12/0877* (2013.01); *G06F 2212/60* (2013.01); *G06F 2212/621* (2013.01)

(58) Field of Classification Search
CPC .............. G06F 12/0835; G06F 12/0877; G06F 2212/60; G06F 2212/621
See application file for complete search history.

(56) References Cited

U.S. PATENT DOCUMENTS

| 6,073,218 | A  | * | 6/2000 | DeKoning | G06F 9/52 710/20 |
| 6,338,117 | B1 | * | 1/2002 | Challenger | G06F 12/121 711/122 |
| 7,236,987 | B1 | * | 6/2007 | Faulkner | G06F 17/30067 |
| 7,328,287 | B1 |   | 2/2008 | Arumugham et al. | 710/31 |
| 7,389,401 | B2 |   | 6/2008 | Li et al. | 711/203 |
| 7,610,438 | B2 |   | 10/2009 | Lee et al. | 711/103 |

(Continued)

OTHER PUBLICATIONS

Jim Handy, "The Cache memory Book" 2nd ed. Academic Press Prof., San Diego CA, 1998.

*Primary Examiner* — David X Yi
*Assistant Examiner* — Ramon A Mercado
(74) *Attorney, Agent, or Firm* — Baker Botts L.L.P.

(57) ABSTRACT

Systems and methods for managing cache configurations are disclosed. In accordance with a method, a system management control module may receive access rights of a host to a logical storage unit and may also receive a desired caching policy for caching data associated with the logical storage unit and the host. The system management control module may determine an allowable caching policy indicator for the logical storage unit. The allowable caching policy indicator may indicate whether caching is permitted for data associated with input/output operations between the host and the logical storage unit. The system management control module may further set a caching policy for data associated with input/output operations between the host and the logical storage unit, based on at least one of the desired caching policy and the allowable caching policy indicator. The system management control module may also communicate the caching policy to the host.

20 Claims, 6 Drawing Sheets

(56) References Cited

U.S. PATENT DOCUMENTS

| | | | | |
|---|---|---|---|---|
| 7,930,481 B1* | 4/2011 | Nagler | ............... | G06F 12/0804 |
| | | | | 710/18 |
| 7,949,831 B2* | 5/2011 | Cypher | ............... | G06F 12/0817 |
| | | | | 711/141 |
| 2004/0030822 A1* | 2/2004 | Rajan | ............... | G06F 3/0605 |
| | | | | 711/4 |
| 2006/0015688 A1* | 1/2006 | Schnapp | ............... | G06F 3/0611 |
| | | | | 711/142 |
| 2006/0236033 A1* | 10/2006 | Guinn | ............... | G06F 12/0871 |
| | | | | 711/118 |

* cited by examiner

SYSTEM AND METHOD FOR MANAGEMENT OF CACHE CONFIGURATION

CROSS-REFERENCE TO RELATED APPLICATION

The present application is a continuation application of copending U.S. patent application Ser. No. 12/776,801 filed May 10, 2010, which is hereby incorporated by reference in its entirety for all purposes.

TECHNICAL FIELD

The present disclosure relates in general to storage resource configuration, and more particularly to a system and method for managing cache configuration of storage resources.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use storage resources to store data. Storage resources may store data on one or more logical storage units, also known simply as "logical units." Each logical unit may be made up of one or more hard disk drives, magnetic tape libraries, optical disk drives, magneto-optical disk drives, compact disk drives, compact disk arrays, disk array controllers, and/or any other type of computer-readable media. In addition, each logical storage unit may have a unique identifier, or logical unit number ("LUN") that identifies the logical unit to an information handling system and/or software executing thereupon.

Information handling systems may cache data associated with input/output operations between the information handling systems and a logical unit. Caching may improve the accessibility of information stored on the logical units. However, properly managing and configuring multiple information handling systems to cache data associated with multiple logical units is increasingly complicated as the number of information handling systems caching data increases.

SUMMARY OF THE INVENTION

In accordance with the teachings of the present disclosure, the disadvantages and problems associated with managing cache configurations have been substantially reduced or eliminated.

In accordance with one embodiment of the present disclosure, a method for managing cache configurations is provided. A system management control module may receive access rights of one or more hosts to one or more logical storage units. At least one of the one or more hosts may be communicatively coupled to at least one of the one or more logical storage units. The system management control module may also receive a desired caching policy for caching data associated with the at least one logical storage unit and the at least one host. The system management control module may determine an allowable caching policy indicator for the at least one logical storage unit. The allowable caching policy indicator may indicate whether caching is permitted for data associated with input/output operations between the at least one host and the at least one logical storage unit. The system management control module may further set a caching policy for data associated with input/output operations between the at least one host and the at least one logical storage unit. The caching policy may be set based on at least one of the desired caching policy and the allowable caching policy indicator. The system management control module may also communicate the caching policy to the at least one host.

In accordance with another embodiment of the present disclosure, a system for managing cache configurations includes one or more logical storage units and one or more hosts communicatively coupled to the one or more logical storage units. The system may further comprise a storage management module communicatively coupled to the one or more hosts. The storage management module may be configured to receive access rights of at least one of the one or more hosts to at least one of the one or more logical storage units. The storage management module may also be configured to receive a desired caching policy for caching data associated with the at least one logical storage unit and the at least one host. The storage management module may determine an allowable caching policy indicator for the at least one logical storage unit based on the access rights of the at least one host to the at least one logical storage unit. The allowable caching policy indicator may indicate whether caching is permitted for data associated with input/output operations between the at least one host and the at least one logical storage unit. The storage management module may be further configured to set a caching policy for data associated with input/output operations between the at least one host and the at least one logical storage unit. The caching policy may be set based on at least one of the desired caching policy and the allowable caching policy indicator. The storage management module may communicate the caching policy to the at least one host. The at least one host may be configured to cache data associated with input/output operations between the at least one host and the at least one logical storage unit according to the caching policy.

In accordance with a further embodiment of the present disclosure, an information handling system may comprise a network interface communicatively coupled to one or more hosts, wherein at least one of the hosts is communicatively coupled to one or more logical storage units. The information handling system may further comprise a user interface and a processor communicatively coupled to the user interface and the network interface. The information handling system may also comprise a computer readable medium communicatively coupled to the processor. The computer readable medium may have stored thereon a program of instructions configured to receive from a user, via the user interface, access rights of the at least one host to at least one of the one or more logical storage units. The program of instructions may also be configured to determine an allowable caching policy indicator for the at least one logical storage unit based on the access rights of the at least one host to the at least one logical storage unit. The allowable caching policy indicator may indicate whether caching is permitted for data associated with input/output operations between the at least one host and the at least one logical storage unit. The program of instructions may also be configured to set a caching policy for data associated with input/output operations between the at least one host and the at least one logical storage unit. The caching policy may be set based on the allowable caching policy indicator. The program of instructions may also be configured to communicate the caching policy to the at least one host, via the network interface.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features and wherein.

DETAILED DESCRIPTION OF THE INVENTION

Preferred embodiments and their advantages are best understood by reference to FIGS. 1-5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such as wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical unit.

Figure 1:
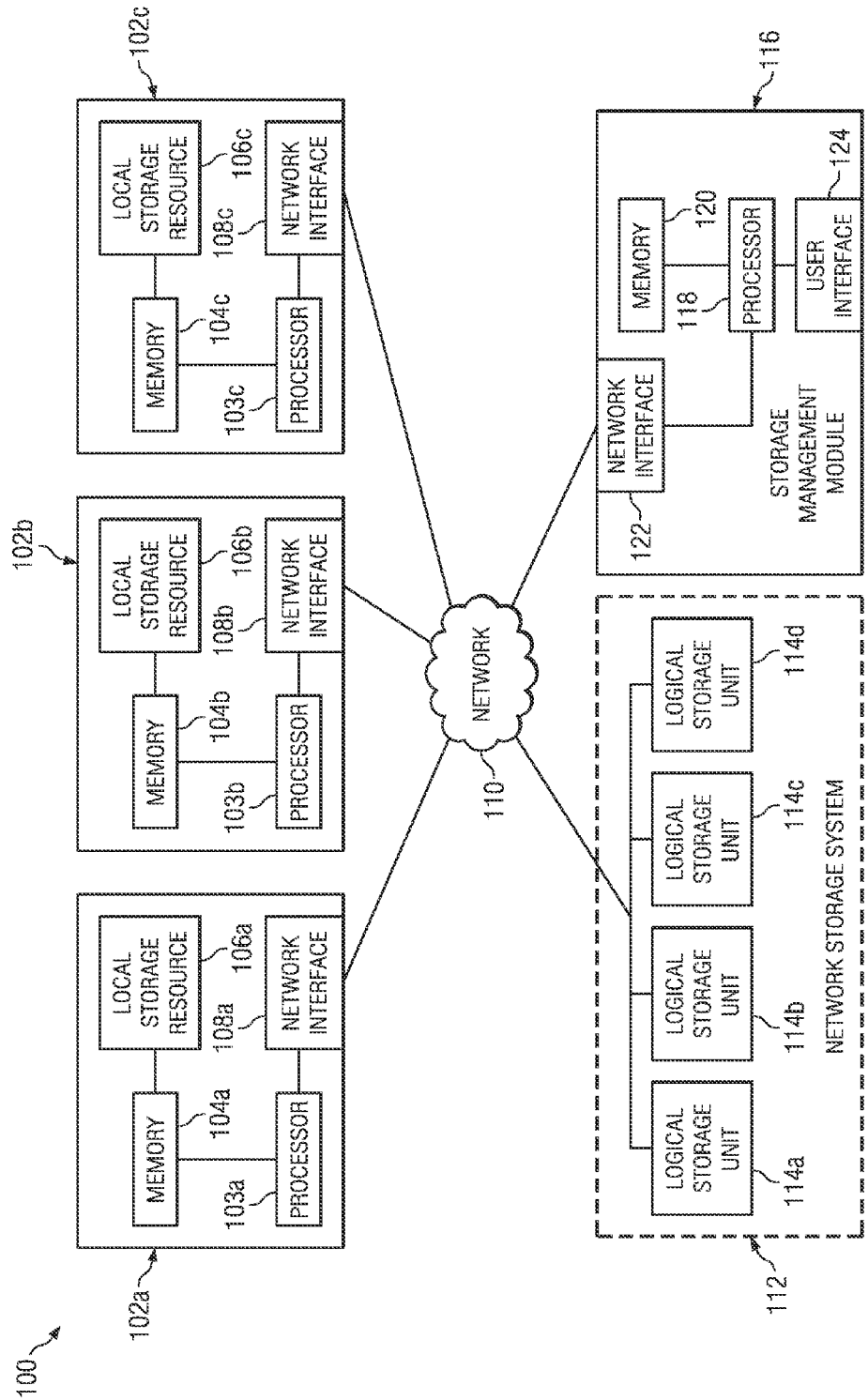
FIG. 1 illustrates a block diagram of an example system for managing cache configuration information for an array of storage resources in accordance with one or more embodiments of the present disclosure.

FIG. 1 illustrates a block diagram of an example system 100 for managing cache configuration information for an array of storage resources according to one or more embodiments of the present disclosure.

As depicted in FIG. 1, system 100 may include one or more hosts 102, a network 110, a network storage system 112 and a storage management module 116.

A host 102 (e.g., hosts 102a-102c) may comprise an information handling system and may generally be configured to receive data from and/or communicate data to one or more other information handling systems via network 110. In certain embodiments, one or more of hosts 102 may be a server. In the same or alternative embodiments, one or more of hosts 102 may be a personal computer. As depicted in FIG. 1, a host 102 may include a processor 103, a memory 104 communicatively coupled to its associated processor 103, a network interface 108 communicatively coupled to its associated processor 103 and a cache resource 106 communicatively coupled to its associated processor 103 and/or associated memory 104.

A processor 103 (e.g., processors 103a-103c) may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in an associated memory 104 and/or another component of an associated host 102.

A memory 104 (e.g., memories 104a-104c) may be communicatively coupled to its associated processor 103 and may comprise any system, device or apparatus operable to retain program instructions or data for a period of time (e.g., computer-readable media). A memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its host 102 is turned off.

A host 102 may also include one or more cache resource 106 configured to store and cache data with respect to input/output operations between the host 102 and one or more logical storage units ("logical units") 114 included in network storage system 112.

In some embodiments a cache resource 106 may comprise a local storage resource that comprises computer readable media (e.g., hard disk drive, floppy disk drive, CD-ROM, and/or any other type of rotating storage media, flash memory, EEPROM, and/or other type of solid state storage media) and may be generally operable to store data.

In other embodiments, a cache resource 106 may comprise a non-volatile storage device that can have data written to it and read from it in a relatively fast amount of time compared to a traditional storage resource such as a hard disk drive. For example, cache resource 106a may be a solid state storage (SSS) device that includes flash memory.

A host 102 may locally cache data associated with logical units 114 to improve performance by storing certain data (e.g., frequently and/or recently used data) locally such that requests for that data can be served faster. Caching data from logical units 114 to a cache resource 106, particularly when a cache resource 106 comprises fast storage media, may permit faster accessibility to the data associated with logical units 114.

A network interface 108 may be any suitable system, apparatus, or device operable to serve as an interface between its associated host 102 and network 110. A network interface 108 may enable its respective host 102 to communicate over network 110 using any suitable transmission protocol and/or standard, including without limitation all transmission protocols and/or standards enumerated below with respect to the discussion of network 110. In certain embodiments, network interface card 108 may comprise a network interface card, or "NIC."

Although system 100 is depicted as having three hosts 102, system 100 may include any number of hosts 102.

Network 110 may be a network and/or fabric configured to couple hosts 102, network storage system 112, and storage management module 116 to each other. In certain embodiments, network 110 may allow hosts 102 to connect to logical units 114 disposed in network storage system 112, such that logical units 114 appear to one or more hosts 102 as locally-attached storage resources. In the same or alternative embodiments, network 110 may include a communication infrastructure which provides physical connections, and a management layer which organizes the physical connections, logical units 114 of network storage system 112, hosts 102, and storage management module 116. In the same or alternative embodiments, network 110 may allow block I/O services and/or file access services to logical units 114 disposed in network storage system 112.

Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS), InfiniBand, SCSI RDMA Protocol (SRP), iSCSI Extensions for RDMA (iSER) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As shown in FIG. 1, network storage system 112 may include one or more logical storage units ("logical units") 114. Network storage system 112 may be communicatively coupled to hosts 102, storage management module 116, and/or network 110, in order to facilitate communication of data between hosts 102 and logical units 114.

A logical unit 114 (e.g., logical units 114a-114d) may each be made up of one or more hard disk drives, magnetic tape libraries, optical disk drives, magneto-optical disk drives, compact disk drives, compact disk arrays, disk array controllers, and/or any other type of computer readable media.

In some embodiments, a logical unit 114 may be a virtual unit comprised of multiple physical storage devices where the virtualization function may be provided by a storage controller. The virtualization function may provide redundancy capabilities such as RAID.

In some embodiments, network storage system 112 may include one or more storage enclosures configured to hold and power one or more physical storage resources including logical units 114. In such embodiments, such storage enclosures may be communicatively coupled to one or more of hosts 102 and/or network 110, in order to facilitate communication of data between hosts 102 and logical units 114.

Although the embodiment shown in FIG. 1 depicts system 100 having four logical units 114, network storage system 110 may have any number of logical units 114.

Storage management module 116 may be communicatively coupled to hosts 102 and/or one or more of logical units 114 (e.g., via network 110). Storage management module 116 may comprise an information handling system and may include a processor 118, a memory 120, a network interface 122 and a user interface 124. In certain embodiments, storage management module 116 may provide functionality including, without limitation, disk aggregation and redundancy (e.g., RAID), input/output (I/O) routing, and error detection and recovery.

Processor 118 may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, processor 118 may interpret and/or execute program instructions and/or process data stored in memory 120 and/or another component of storage management module 116.

In these and other embodiments, processor 118 may be configured to manage the communication of data between one or more of hosts 102 and one or more of logical units 114, including without limitation, managing cache configuration information. In certain embodiments, processor 118 may provide functionality including, without limitation, disk aggregation and redundancy (e.g., RAID), input/output (I/O) routing, and error detection and recovery. Processor 118 may be implemented using hardware, software or any combination of both.

Memory 120 may be communicatively coupled to processor 118 and may comprise any system, device or apparatus operable to retain program instructions or data for a period of time (e.g., computer-readable media). A memory 120 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to storage management module 116 is turned off.

Network interface 122 may be communicatively coupled to processor 118 and may include any suitable system, apparatus, or device operable to serve as an interface between storage management module 116 and network 110. Network interface 122 may enable storage management module 116 to communicate over network 110 using any suitable transmission protocol and/or standard, including without limitation all transmission protocols and/or standards enumerated above with respect to the discussion of network 110. In certain embodiments, network interface 122 may comprise a network interface card, or "NIC."

Storage management module 116 may also include a user interface 124. User interface 124 may be communicatively coupled to processor 118 and may include any system, apparatus or device configured to receive input from a user or administrator of system 100. User interface 124 may also be configured to provide information to the user or administrator. User interface 124 may be configured to receive the user input and provide the user information via network 110, a separate network and/or another information handling system directly coupled to storage management module 116 and/or user interface 124.

Although FIG. 1 depicts a single storage management module 116, system 100 may include any suitable number of storage management modules 116. Further, although storage management module 116 is depicted as including processor 118, memory 120, network interface 122 and user interface 124, the functionality of each of these components may be performed by more or fewer components than those depicted and may be included in a single component. Additionally, storage management module 116 may be included in other information handling systems within system 100 (e.g., network storage system 112 or a host 102). System 100 may include additional components for redundancy and reliability such as multiple network paths, multiple NICS, redundant storage management modules, etc.

In the embodiment depicted in FIG. 1, one or more hosts 102 may have access to one or more logical units 114. In some instances, a host 102 may have exclusive access to a logical unit 114. For example, host 102a may have exclusive access to logical unit 114a, host 102b may have exclusive access to logical unit 114b, and host 102c may have exclusive access to logical unit 114c. In other instances, multiple hosts 102 may access a logical unit 114. For example, both hosts 102a and 102b may have access to logical unit 114d. Information regarding access rights between hosts 102 and logical units 114 may be stored in a table, map, database, or other suitable data structure on memory 120 or other suitable component of system 100.

A host 102 may be configured to locally cache data associated with input/output operations between the host 102, or the host 102's associated cache resource 106, and a logical unit 114 to which the host 102 may have access. The data associated with logical units 114 may be stored on a relatively inexpensive storage media such as a traditional hard disk drive. The hard disk drive may have the capability to store large amounts of data at a low cost. But the hard disk drive may also require a relatively large amount of time to write data to the hard disk drive and to retrieve data from the hard disk drive, especially when logical units 114 are remotely coupled to a host 102 via network 110. Caching data from logical units 114 to cache resource 106, particularly when fast storage media is used, may permit faster accessibility to the data associated with logical units 114.

Further, because a fraction of the data stored within a logical unit 114 may be cached on a higher speed storage device, the lower cost of storage on a slower storage device, such as a hard disk drive, compared to the higher cost of storage on a faster storage device, such as SSS device, may still be utilized. Therefore, the depicted caching scheme may provide the high speed capability of devices such as SSS devices with the low cost nature of other traditional storage devices such as hard disk drives.

In many instances, it may be desirable for a host 102 to locally cache data associated with a logical unit 114 if the host 102 has exclusive access to the logical unit 114. By only allowing hosts 102 to cache data associated with logical units 114 to which hosts 102 have exclusive access, the necessity of cache coherency to ensure that the data being cached by a host 102 is correct and consistent may be reduced or eliminated. Cache coherency among a large number of hosts 102 and logical units 114 may require complicated configuration schemes and may deplete network resources to a degree that the performance benefits of caching on a host 102 may become marginal.

To illustrate, reference is made to Table 1 below. Table 1 may depict an example logical unit access table that may be stored on memory 120 or another component of system 100. The logical unit access table may set forth the various logical units 114 and the hosts 102 that have access to such logical units 114. In such a configuration, it may be desirable that host 102a may cache data associated with logical unit 114a, host 102b may cache data associated with logical unit 114b, and host 102c may cache data associated with logical unit 114c, because each of such logical units 114 may be exclusively accessed by each host 102 respectively. However, it may not be desirable that hosts 102a and 102b cache data associated with logical unit 114d because neither host 102a nor host 102b has exclusive access to logical unit 114d.

TABLE 1

| Logical Unit | Host Access |
| --- | --- |
| 114a | 102a |
| 114b | 102b |
| 114c | 102c |
| 114d | 102a, 102b |

Hosts 102 may cache data according to a caching policy. Caching policies may include "no-caching," "read-only," "write-through," or "write-back." A caching policy of "no-caching" may indicate that a host 102 is not permitted to cache data from a logical unit 114.

A caching policy of "read-only" (sometimes referred to as "no-write") may indicate that a host 102 is permitted to read data from a logical unit 114 and cache the data read from the logical unit 114 in local storage resource 106. However, if a host writes to a location that has data cached in local storage resource 106, the data in the local storage resource 106 may be invalidated and the host 102 may write the data to logical storage unit 114.

A caching policy of "write-through" may indicate that a host 102 may read and cache data from a logical unit 114. When a host reads data that is cached in local storage resource 106, it may retrieve the data directly from the local storage resource 106. If a host 102 writes data, it may write the data both to local storage resource 106 and logical storage unit 114. The host may not consider the write completed until the data write has been acknowledged as complete by logical storage unit 114.

A caching policy of "write-back" may indicate that a host 102 may read and cache data from a logical unit 114. When the host reads data that is cached in local storage resource 106, it may retrieve the data directly from the local storage resource 106. When a host 102 writes data, it may write the data directly to the local storage resource 106 and consider the write complete. The host 102 can then return later to write the data out to logical storage unit 114 when processing time permits.

Storage management module 116 may control and maintain the caching configurations of each host 102. For example, storage management module 116 may ensure that the caching configurations of a host 102 correctly correspond with the access rights of a host 102 to a particular local storage unit 114. Further, storage management module 116 may centrally manage the caching configurations to help simplify the complicated nature of caching data with multiple hosts 102 and multiple logical units 114.

In operation, processor 118 in storage management module 116 may receive, from a storage user or administrator, via user interface 124, the access rights and desired caching policies for a host 102 with respect to one or more logical units 114 to which the hosts 102 may have access. In other embodiments, processor 118 may receive access rights and desired caching policies from another information handling system in system 100.

For example, processor 118 may receive, from a storage administrator via user interface 124, information indicating that: 1) host 102a has access to logical unit 114a; 2) host 102b has access to logical unit 114b; 3) host 102c has access to logical unit 114c; and 4) hosts 102a and 102b have access to logical unit 114d. The information from the administrator may also indicate that: 1) hosts 102b and 102c do not have access to logical unit 114a; 2) hosts 102a and 102c do not have access to logical unit 114b; 3) hosts 102a and 102b do not have access to logical unit 114c; and 4) host 102c does not have access to logical unit 114d.

Processor 118 may store the access rights of hosts 102 to a logical unit 114 on a logical unit access table included in memory 120. According to one embodiment, the logical unit access table may be configured according to Table 1 above.

Processor 118 may also receive, from the storage administrator, via user interface 124, a desired caching policy for host 102a of "read-only" with respect to logical unit 114a and of "write-back" with respect to logical unit 114d. Processor 118 may also receive, from the storage administrator, via user interface 124, a desired caching policy for host 102b of "no-caching" with respect to logical unit 114b and a desired caching policy of "write-back" with respect to logical unit 114d. Additionally, processor 118 may receive, from the storage administrator, via user interface 124, a desired caching policy for host 102c of "write-through" with respect to logical unit 114c.

Processor 118 may also store the desired caching policies with respect to a logical unit 114 and a host 102 on the logical unit access table. Accordingly, in some embodiments, the logical unit access table depicted in Table 1 may be modified and the logical unit access table may be configured according to Table 2.

TABLE 2

| Logical Unit | Host Access | Desired Caching-Policy |
|---|---|---|
| 114a | 102a | "read-only" |
| 114b | 102b | "no-caching" |
| 114c | 102c | "write-through" |
| 114d | 102a, 102b | "write-back" |

After receiving the access rights and caching policies from the administrator, processor 118 may determine an allowable caching policy indicator for a logical unit 114 according to the access rights of one or more hosts 102 to one or more logical units 114. The allowable caching policy indicator may permit caching with respect to a logical unit 114 if the access rights indicate that a host 102 has exclusive access to the logical unit 114.

For example, in the present embodiment, based on the access rights stored in the logical unit table, processor 118 may determine that: 1) host 102a has exclusive access to logical unit 114a; 2) host 102b has exclusive access to logical unit 114b; 3) host 102c has exclusive access to logical unit 114c; and 4) hosts 102a and 102b do not have exclusive access to logical unit 114d.

Accordingly, processor 118 may determine an allowable caching policy indicator for logical units 114a, 114b, and 114c indicating that caching is permitted for data associated with input/output operations between host 102a and logical unit 114a, host 102b and logical unit 114b, and host 102c and logical unit 114c. But, because both hosts 102a and 102b have access to logical unit 114d and, therefore, do not have exclusive access to logical unit 114d, the allowable caching policy indicator for logical unit 114d may indicate that caching is not permitted for data associated with input/output operations between hosts 102a and 102b, and logical unit 114d.

After determining the allowable caching policy indicator for each logical unit 114, processor 118 may set a caching policy for data associated with input/output operations between hosts 102 and logical units 114 based on the allowable caching policy indicator, the desired caching policy received from the storage administrator or user, or a combination of the allowable caching policy indicator and the desired caching policy.

In the example depicted in Tables 1 and 2, processor 118 may set a caching policy for logical unit 114a and host 102a of "read-only" because the allowable caching policy indicator for logical unit 114a and host 102a may indicate that caching is permitted between logical unit 114a and host 102a. Also, the desired caching policy received from the administrator may be "read-only" and because caching is permitted, as indicated by the allowable caching policy indicator, processor 118 may set the caching policy to the desired caching policy received from the storage administrator.

Processor 118 may also set the caching policy between logical unit 114b and host 102b to "no-caching" according to the desired caching policy received from the administrator. Even though the allowable caching policy indicator may indicate that caching is permitted between host 102b and logical unit 114b, processor 118 may set the caching policy to "no-caching" according to the desired caching policy received from the storage administrator.

In comparison, processor 118 may set the caching policy with respect to logical unit 114*d* and hosts 102*a* and 102*b* to "no-caching" even though the desired caching policy may be "write-back." The allowable caching policy indicator may indicate that caching is not permitted between hosts 102*a* and 102*b*, and logical unit 114*d* because hosts 102*a* and 102*b* may not have exclusive access to logical unit 114*d*. Therefore, even though the desired caching policy may be "write-back," processor 118 may set the caching policy to "no-caching" based on the allowable caching policy indicator indicating that caching between hosts 102*a* and 102*b*, and logical unit 114*d* is not permitted.

Processor 118 may also set the caching policy with respect to logical unit 114*c* and host 102*c* to "write-through" as directed by the administrator. Due to host 102*c* having exclusive access to logical unit 114*c*, the allowable caching policy indicator may indicate that caching is permitted, and processor 118 may set the caching between host 102*c* and logical unit 114*c* according to the desired caching policy.

In some embodiments, instead of storing the desired caching policy on the logical unit access table, as depicted in Table 2, processor 118 may store the set caching policy associated with each host 102 and logical unit 114 in the logical unit access table as depicted in Table 3.

TABLE 3

| Logical Unit | Host Access | Caching Policy |
| --- | --- | --- |
| 114a | 102a | "read-only" |
| 114b | 102b | "no-caching" |
| 114c | 102c | "write-through" |
| 114d | 102a, 102b | "no-caching" |

After setting the caching policy associated with each logical unit 114 and host 102, processor 118 may communicate the caching policy associated with each host 102 and logical unit 114 to hosts 102. Processor 118 may also communicate to each host 102 their respective access rights to each logical unit 114. In the present embodiment, processor 118 may communicate the access rights and caching policies via network interface 122 and network 110. In alternative embodiments, processor 118 may communicate the access rights and caching policies via any suitable interface between storage management module 116 and hosts 102.

Processor 118 may communicate the caching policies and access rights in response to a login request from hosts 102. For example, processor 118 may communicate the access rights and caching policies associated with host 102*a*, after receiving a login request from host 102*a*, via network 110 and storage network interface 122.

In another embodiment, after receiving and setting the caching policies, processor 118 may automatically communicate the caching policies and access rights to hosts 102. For example, after receiving the access rights and desired caching policies of host 102*a* and after setting the caching policies for host 102*a* according to the access rights and allowable caching policy indicator, processor 118 may automatically send the caching policy to host 102*a*.

Processors 103 within hosts 102 may receive the caching policy and access rights from storage management module 116 via network interfaces 108. Each processor 103 may be configured to manage and control caching with respect to its respective host 102 and logical units 114 to which the respective host 102 may have access.

Processors 103 may direct that the caching policies and access rights be stored in memories 104. Memories 104 may also include computer readable media configured to execute the commands and instructions necessary to permit hosts 102 to cache data from logical units 114.

Modifications additions or omissions may be made to system 100 without departing from the scope of the disclosure. For example, more or fewer hosts 102, logical units 114 and/or storage management modules 116 may be included within system 100.

Figure 2:
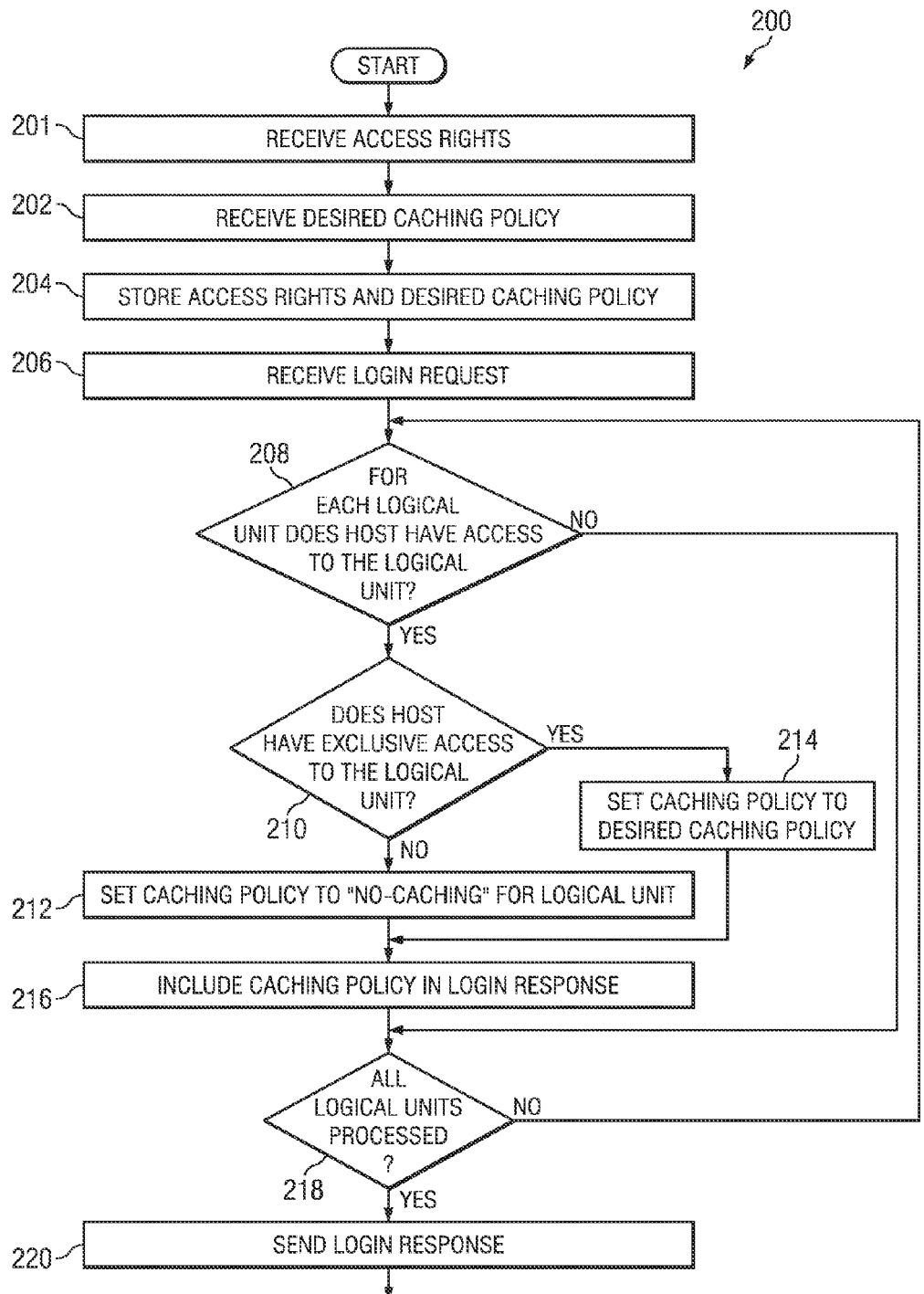
FIG. 2 illustrates a flow chart of an example method for setting a caching policy for a host by a storage management module in accordance with one or more embodiments of the present disclosure.

FIG. 2 illustrates a flow chart of an example method 200 for setting a caching policy for a host by a storage management module. In the present example, the method may be described using the elements described in FIG. 1. However, the method may be performed by components and devices other than those explicitly disclosed without departing from the scope of the disclosure.

At step 201, storage management module 116 may receive, from a storage administrator or user, or another information handling system included in system 100, access rights of hosts 102 to logical units 114. At step 202, storage management module 116 may also receive a desired caching policy from the storage administrator or user, or another information handling system. In alternative embodiments, the functions performed in steps 201 and 202 may be performed in the same step.

At step 204, storage management module 116 may store the access rights and desired caching policy in a logical unit access table. In another embodiment, storage management module 116 may store only the access rights in the logical unit access table at step 204.

At step 206, storage management module 116 may receive a login request from a host 102 such as host 102*a* for example. At step 208, storage management module 116 may use the logical unit access table to determine the access rights of host 102*a* with respect to logical units 114. If host 102*a* has access to a logical unit 114, storage management module 116 may determine if host 102*a* has exclusive access to the logical unit 114 at step 210. If host 102*a* does not have access to a logical unit 114, method 200 may proceed to step 218. Storage management module 116 may determine the access rights of host 102*a* to each logical unit 114 before proceeding to step 210. In another embodiment, storage management module 116 may determine the access rights of host 102*a* to a single logical unit 114 and proceed through method 200 for that particular logical unit 114 before proceeding through method 200 for other logical units 114.

At step 210, storage management module 116 may use the logical unit access table to determine if host 102*a* has exclusive access to the logical units 114 to which host 102*a* has access. As with step 208, storage management module 116 may perform step 210 with respect to each logical unit 114 to which host 102*a* has access before proceeding to other steps in the method. Alternatively, also as with step 208, storage management module 116 may perform step 210 with respect to one logical unit 114 to which host 102*a* has access and proceed through the method for that particular logical unit 114 before proceeding through the method for other logical units 114 to which host 102*a* may have access.

The remainder of the method describes an embodiment where storage management module 116 may proceed through each step in the method for an individual logical unit 114 before proceeding through the method for another logical unit 114; however, the present disclosure should not be limited to such.

If storage management module 116 determines that host 102*a* does not have exclusive access to a particular logical unit 114 at step 210, storage management module 116 may set the caching policy for host 102*a* with respect to that logical unit 114 to "no-caching" and the method may proceed to step 216. However, if storage management module 116 determines that host 102*a* has exclusive access to a particular logical unit 114, at step 214, storage management module 116 may set the caching policy for that particular logical unit 114 to the desired caching policy stored in the logical unit access table.

For example, storage management module 116 may perform steps 210 and 212 with respect to host 102*a* and logical unit 114*d*. In the present embodiment, at step 210, storage management module 116 may use the logical unit access table to determine that host 102*a* may not have exclusive access to logical unit 114*d* and storage management module 116 may set the caching policy for host 102*a* with respect to logical unit 114*a* to "no-caching" and the method may move to step 216.

Storage management module 116 may also perform steps 210 and 214 with respect to host 102*a* and logical unit 114*a*. In the present embodiment, host 102*a* may have exclusive access to logical unit 114*a* and therefore storage management module 116 may set the caching policy for host 102*a*, with respect to logical unit 114*a*, according to a desired caching policy of "read-only" which may be stored in the logical unit access table.

Following steps 214 or 212, storage management module 116 may include the caching policies set for host 102*a* in a login response at step 216. For example, following step 214, performed with respect to logical unit 114*a*, storage management module 116 may include, in the login response, a caching policy of "read-only" for host 102*a* with respect to logical unit 114*a*. Following step 212, performed with respect to logical unit 114*d*, storage management module 116 may also include, in the login response, a caching policy of "no-caching" for host 102*a* with respect to logical unit 114*d*.

Following step 216, at step 218, storage management module 116 may determine whether the access rights and caching policies have been determined for all of the logical units 114 (whether all the logical units have been "processed") with respect to host 102*a*. If all of the logical units 114 have not been processed, the method may return to step 208. If all of the logical units have been processed, storage management module 116 may send the login response to host 102*a* at step 220 and the method may end.

In another embodiment, storage management module 116 may perform steps 208-214 with respect to hosts 102 and logical units 114 in a storage network after receiving the desired access rights and caching policies, but before receiving a login request from any particular host 102. Before receiving a login request, storage management module 116 may set the caching policy for each host 102 according to the access rights and desired caching policy. Storage management module 116 may store the set caching policy in the logical unit access table instead of storing the desired caching policy in the logical unit access table. Therefore, after receiving a login request from a host 102, storage management module 116 may include the caching policies for the host 102 in the login response according to the logical unit access table without having to perform steps 210-214, because those steps may have already been performed. Additionally, in another embodiment, storage management module 116 may send the caching policies to hosts 102 without receiving a login request.

One or more components within storage management module 116 may perform the steps described by method 200 in FIG. 2, or one or more information handling systems, such as storage management module 116 may perform all or some of the steps described. Further, modifications, additions or omissions may be made to method 200 without departing from the scope of the disclosure. For example, the order of the steps may be changed, steps may be combined, steps may be performed simultaneously, or steps may be added without departing from the scope of the disclosure.

Figure 3:
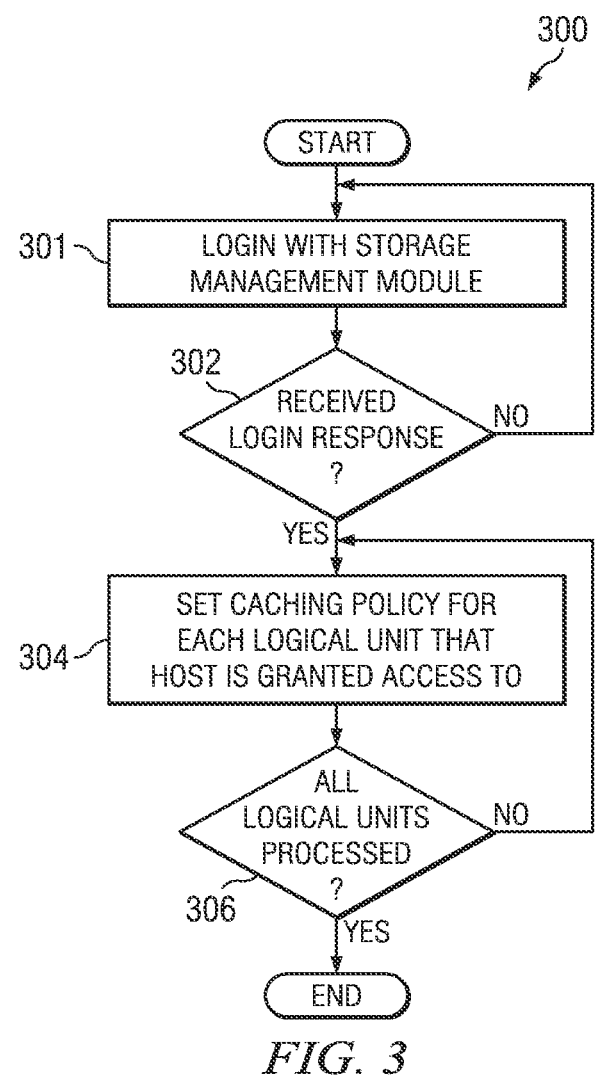
FIG. 3 illustrates a flow chart of an example method for setting a caching policy at a host in accordance with one or more embodiments of the present disclosure.

FIG. 3 illustrates a flow chart of an example method 300 for setting a caching policy at a host 102. In the present embodiment, method 300 is described with respect to host 102*a*, but the method may be applied to any host 102 or information handling system configured to cache data. At step 301 host 102*a* may login to storage management module 116. At step 302, host 102*a* may receive a login response from storage management module 116. If host 102*a* has not received the login response at step 302, host 102*a* may wait until receiving the login response. The login response may include information indicating to which logical units 114 host 102*a* may have access. In the present example, the login response may indicate that host 102*a* has access to logical unit 114*a* and logical unit 114*d*.

The login response may also include information indicating the caching policy that host 102*a* may set for each logical unit 114 to which host 102*a* may have access. In the present example, the login response may indicate that the caching policy for host 102*a* with respect to logical unit 114*a* is "read-only." The login response may also indicate that the caching policy for host 102*a* with respect to logical unit 114*d* is "no-caching."

At step 304, host 102*a* may set the caching policy for a logical unit 114 to which host 102*a* has access, according to the login response. For example, host 102*a* may set the caching policy to "read-only" for logical unit 114*a* according to the login response received from storage management module 116.

At step 306, host 102*a* may determine if it has set the caching policy for all of the logical units 114 to which host 102*a* has access, according to the login response. If host 102*a* has not set the caching policy for all of the logical units 114, host 102*a* may return to step 304 to finish setting the caching policy. For example, after setting the caching policy for logical unit 114*a*, host 102*a* may determine that it needs to set the caching policy for logical unit 114*d*, because the login response may indicate that host 102*a* also has access to logical unit 114*d*. Therefore, the method may return to step 304 and host 102*a* may set the caching policy for logical unit 114*d* to "no-caching" as indicated by the login response.

If host 102*a* determines that the caching policies for each logical unit 114 indicated in the login response have been set, the method may end.

One or more components within hosts 102 may perform the steps described by method 300 in FIG. 3. Further, modifications, additions or omissions may be made to the method without departing from the scope of the disclosure. For example, the order of the steps may be changed, steps may be combined, steps may be performed simultaneously, or steps may be added without departing from the scope of the disclosure.

Figure 4:
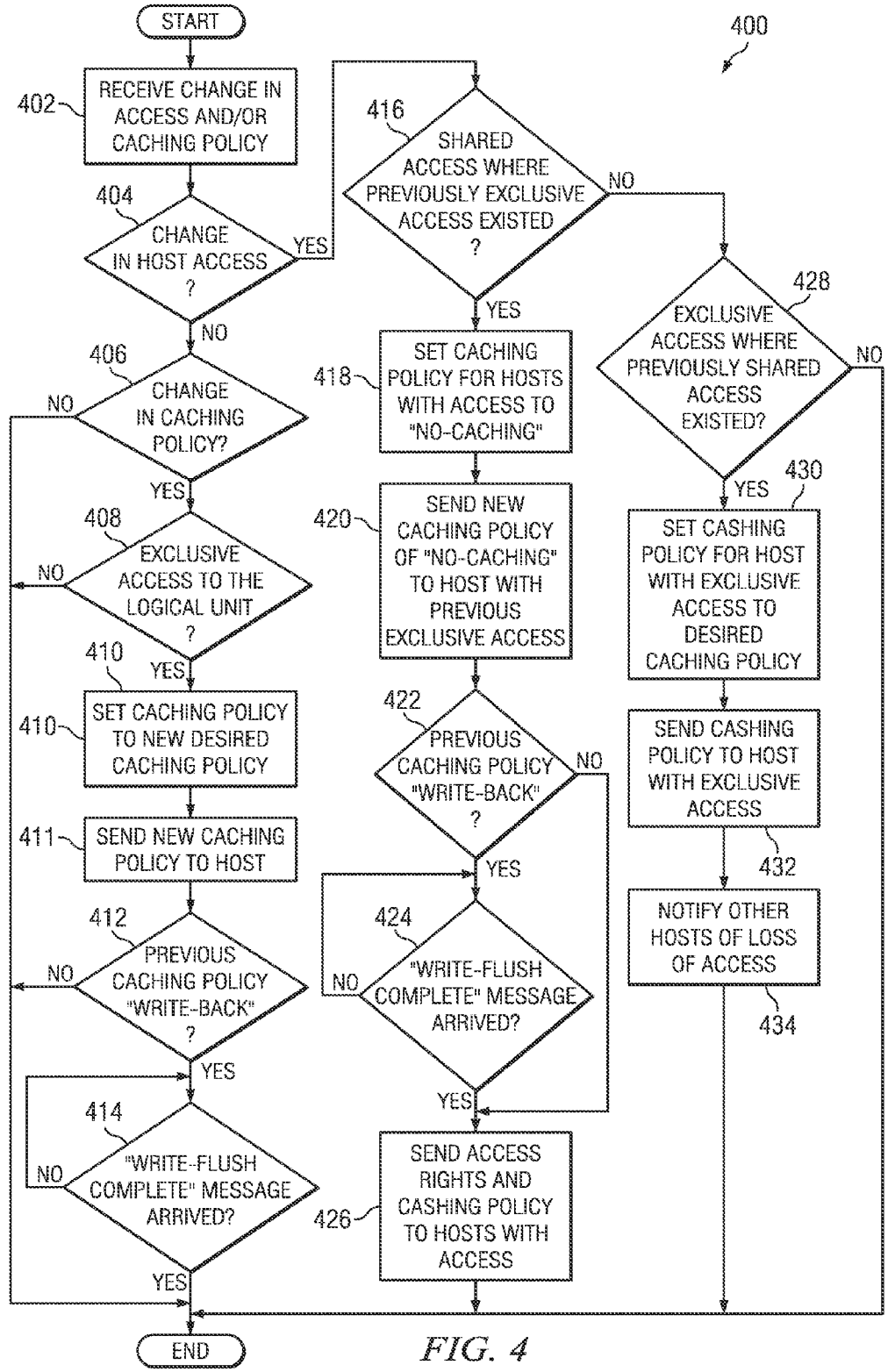
FIG. 4 illustrates a flow chart of an example method for changing a caching policy for a host by a storage management module in accordance with one or more embodiments of the present disclosure.

FIG. 4 illustrates a flow chart of an example method 400 for changing a caching policy for a host by a storage management module. The present example may be described with respect to system 100 and particularly hosts 102, logical units 114, and storage management module 116. However, method 400 is not limited to the present example.

At step 402, storage management module 116 may receive input from the system administrator or user that may dictate a change in the logical unit access table. The change may occur due to a change in access to one or more logical units 114 by one or hosts 102, or the change may occur due to a change in the desired caching policy for one or more hosts 102 with respect to one or more logical units 114.

At step 404, storage management module 116 may determine if the change is due to a change in access to at least one logical unit 114 by at least one host 102. If a change has not occurred in access, storage management module 116 may determine, at step 406, if a change in caching policy occurred for at least one host 102 with respect to at least one logical unit 114. If a change has not occurred in access or caching policies, method 400 may end after step 406. However, if a change has occurred in a caching policy, method 400 may continue through steps 408-414.

For example, the storage administrator may dictate that the desired caching policy of host 102a with respect to logical unit 114a is "write-through" instead of the previous caching policy of "read-only" at step 402. Storage management module 116 may determine, at step 404, that the change is not in access of at least one host 102 to at least one logical unit 114 and may determine at step 406 that the change is in the caching policy of host 102a with respect to logical unit 114a.

At step 408, storage management module 116 may determine if host 102a has exclusive access to logical unit 114a. In the present embodiment, host 102a may have exclusive access to logical unit 114a and, at step 410 storage management module 116 may set the new caching policy for host 102a, with respect to logical unit 114a, to "write-through" according to the new desired caching policy. At step 411, storage management module 116 may also send the new caching policy of "write-through" to host 102a.

At step 412, storage management module 116 may determine if the previous caching policy for host 102a with respect to logical unit 114a was "write-back." If the previous caching policy was "write-back," instead of "read-only," storage management module 116 may wait at step 414 to receive a "write-flush completed" message from host 102a. The "write-flush completed" message may indicate that host 102a flushed the cache entries for logical unit 114a.

In a "write-flush," host 102a may write data to logical unit 114a, data that host 102a has cached, but that host 102a has not written to logical unit 114a. Thus, the data on logical unit 114a may be up to date before the caching policy of host 102a changes. By waiting until the "write-flush completed" message arrives, storage management module 116 may ensure that the data on logical unit 114a is up to date before directing that any other data operations with respect to logical unit 114a are performed.

After receiving the "write-flush completed" message at step 414, the method may end. At step 412, if the previous caching policy for host 102a with respect to logical unit 114a was not "write-back" the method may skip step 414 and end.

In another embodiment, host 102a may not have had exclusive access to logical unit 114a at step 408. The caching policy for host 102a may have previously been set to "no-caching" because host 102a may not have had exclusive access to logical unit 114a. At step 408, if host 102a still does not have exclusive access to logical unit 114a, the caching policy may not be changed from "no-caching." Accordingly, after step 408, if host 102a does not have exclusive access to logical unit 114a the method may end.

Returning to step 404, in another embodiment, instead of changing the caching policy of at least one host 102 with respect to at least one logical unit 114 at step 402, the storage administrator or user may change the access of at least one host 102 to at least one logical unit 114, and the method may proceed to step 416 from step 404. At step 416, storage management module 116 may determine whether the change in access resulted in shared access to a logical unit 114 by hosts 102 where previously exclusive access to the logical unit 114 existed by a single host 102 existed. If the change in access resulted in shared access then the method may move to steps 418-426.

In an example embodiment, a user may change the access rights at step 402 so that hosts 102a and 102b have access to logical unit 114a, whereas previously host 102a may have had exclusive access to logical unit 114a. At step 404, storage management module 116 may determine that a change in host 102 access to logical unit 114a occurred. Storage management module 116 may then determine at step 416 that hosts 102a and 102b share access to logical unit 114a whereas, previously, host 102a had exclusive access to logical unit 114a.

At step 418, storage management module 116 may set a caching policy of "no-caching" for both hosts 102a and 102b with respect to logical unit 114a because neither host 102a nor host 102b may have exclusive access to logical unit 114a. At step 420, storage management module 116 may send the new caching policy of "no-caching" to host 102a.

At step 420, storage management module 116 may determine if the previous caching policy for host 102a with respect to logical unit 114a was "write-back." If the previous caching policy was "write-back," storage management module 116 may wait at step 424 to receive a "write-flush completed" message from a host 102a. The "write-flush completed" message may indicate that host 102a flushed the cache entries for logical unit 114a.

After receiving the "write-flush completed" message at step 424, storage management module 116 may send, at step 426 a message to host 102b indicating that host 102b has access to logical unit 114a. The message may also include the caching policy of "no-caching" for host 102b with respect to logical unit 114a. Following step 426, the method may end. At step 422, if the previous caching policy for host 102a with respect to logical unit 114a was not "write-back" the method may skip step 424 and proceed to step 426.

Returning to step 416, if storage management module 116 determines that the change in access did not result in shared access to one or more logical units 114 by one or more hosts 102, storage management module 116 may determine at step 428 if the change resulted in a host 102 having exclusive access to a logical unit 114 where previously the host 102 had shared access to the logical unit 114.

At step 428, if the change in the access rights did not result in at least one host 102 having exclusive access to at least one logical unit 114 where previously two or more hosts 102 shared access to at least one logical unit 114, the change in access rights may have occurred due to an addition of one or more hosts 102 or logical units 112 to the storage system. In such a case, method 400 may proceed from step 428 according to steps described in methods 200 and 300 as described in FIGS. 2 and 3, and method 400 may end.

However, if the change in access rights results in at least one host 102 having exclusive access to at least one logical unit 114 where previously two or more hosts 102 shared access to at least one logical unit 114, method 400 may proceed through steps 430-434.

In an example embodiment, hosts 102a and 102b may have previously had access to logical unit 114d. At step 402, a storage administrator or user may change the access of host 102b to logical unit 114d such that host 102b no longer has access to logical unit 114d, thus, host 102a may have exclusive access to logical unit 114*d* whereas, previously, host 102*a* may not have had exclusive access to logical unit 114*d*.

At step 404, storage management module 116 may determine that host 102*b* no longer has access to logical unit 114*d*. At step 416, storage management module 116 may determine that the change did not result in shared access to at least one logical unit 114 where previously a single host 102 had exclusive access and method 400 may proceed to step 428. Storage management module 116 may determine, at step 428, that host 102*a* now has exclusive access to logical unit 114*d* whereas, previously, hosts 102*a* and 102*b* shared access to logical unit 114*d*.

At step 430, storage management module 116 may set the caching policy for host 102*a*, with respect to logical unit 114*d*, to the desired caching policy, as indicated by the storage administrator when the storage administrator changed the access rights of host 102*a* with respect to logical unit 114*d*. At step 432, storage management module 116 may send the new caching policy for logical unit 114*d* to host 102*a*. At step 434, storage management module 116 may notify host 102*b* that it no longer has access to logical unit 114*d*, and the method may end.

Figure 5A:
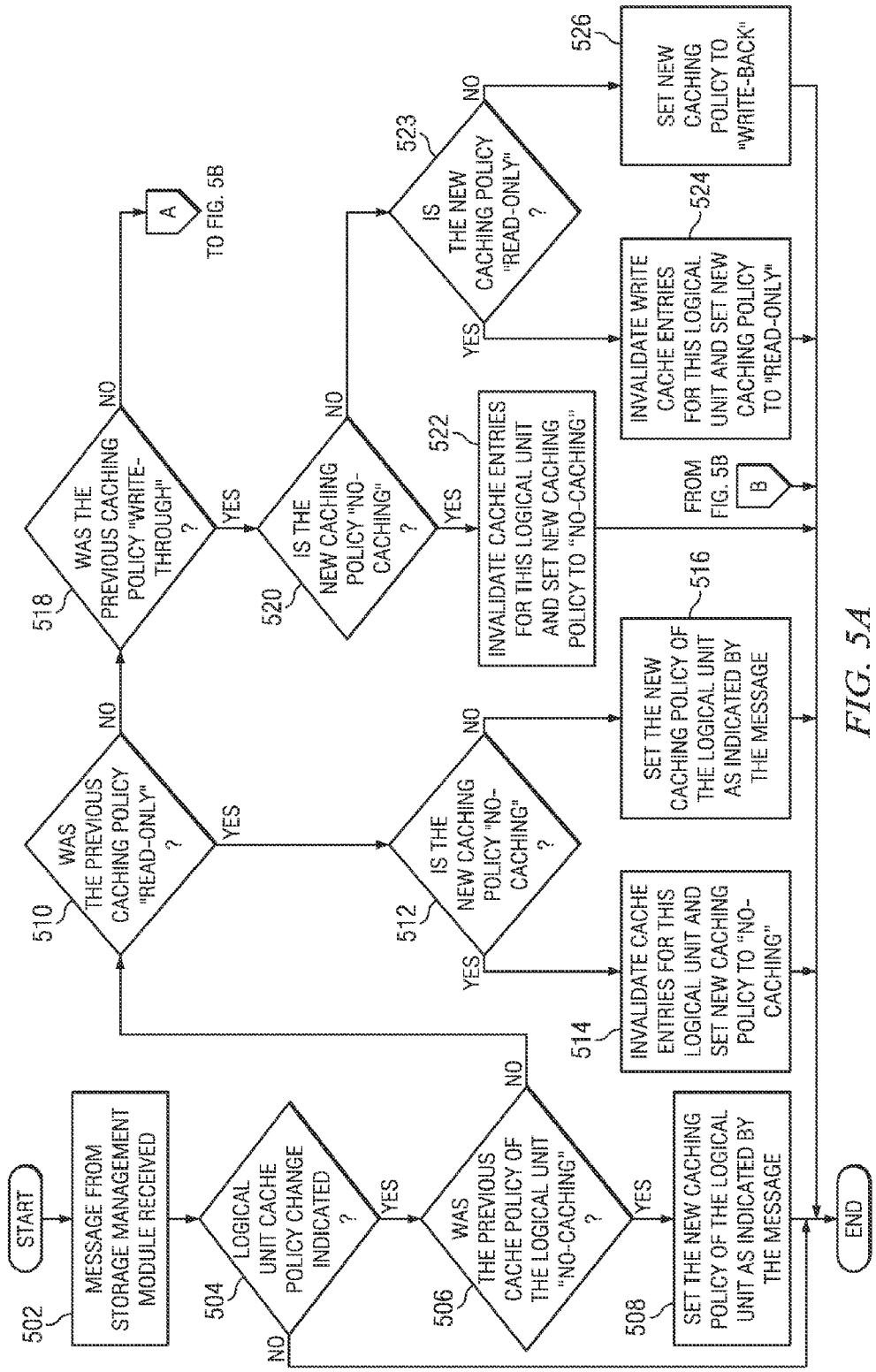
FIGS. 5A and 5B illustrate a flow chart of an example method 500 for changing a caching policy at a host in accordance with one or more embodiments of the present disclosure.
Figure 5B:
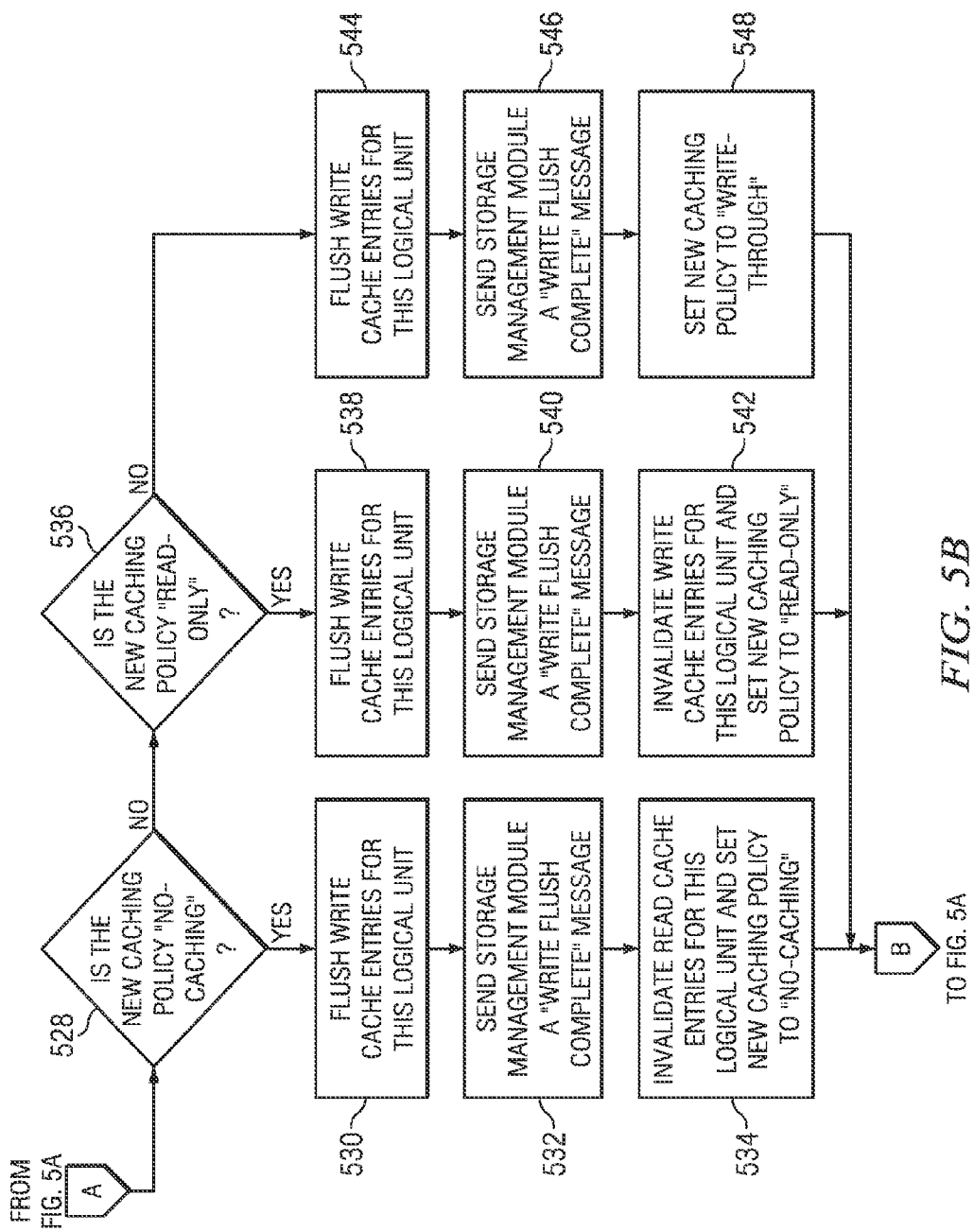

One or more components within storage management module 116 may perform the steps described by method 400. Further, modifications, additions or omissions may be made to method 400 without departing from the scope of the disclosure. For example, the order of the steps may be changed, steps may be combined, steps may be performed simultaneously, or steps may be added without departing from the scope of the disclosure. FIGS. 5A and 5B illustrate a flow chart of an example method 500 for changing a caching policy at a host. The present example may be described with respect to system 100, and particularly with respect to host 102*a*, logical unit 114*a* and storage management module 116. However, method 500 is not limited to the present example.

Method 500 may begin at step 502, depicted in FIG. 5A. At step 502 host 102*a* may receive a message from storage management module 116. At step 504, host 102*a* may determine if the message indicates a change in a caching policy with respect to a logical unit 114, to which the host 102*a* may have access. If the message does not indicate a change at step 504, method 500 may end. However, if the message does indicate a change in caching policy for a logical unit 114, such as logical unit 114*a*, at step 504, method 500 may proceed to step 506.

At step 506, host 102*a* may determine if the previous caching policy for logical unit 114*a* was "no-caching." If the previous caching policy was "no-caching," method 500 may proceed to step 508, otherwise method 500 may proceed to step 510.

At step 508, host 102*a* may set the caching policy with respect to logical unit 114*a* according to the instructions in the message received from storage management module 116. After step 508, method 500 may end.

At step 510, host 102*a* may determine if the previous caching policy with respect to logical unit 114*a* was "read-only." If the previous caching policy was "read-only," method 500 may proceed to step 512, if the previous caching policy was not "read-only" method 500 may proceed to step 518.

At step 512, host 102*a* may determine if the new caching policy is "no-caching." If the new caching policy is "no-caching," method 500 may proceed to step 514, if the new caching policy is not "no-caching" method 500 may proceed to step 516.

At step 514, host 102*a* may invalidate the cache entries for logical unit 114*a* and set the new caching policy to "no-caching," and method 500 may end.

At step 516, host 102*a* may set the new caching policy of logical unit 114*a* as indicated in the message received from storage management module 116, and method 500 may end.

At step 518, host 102*a* may determine if the previous caching policy for logical unit 114*a* was "write-through." If the previous caching policy was "write-through," method 500 may proceed to step 520, if the previous caching policy was not "write-through," method 500 may proceed to step 528, depicted in FIG. 5B.

At step 520, host 102*a* may determine if the new caching policy is "no-caching." If the new caching policy is "no-caching," method 500 may proceed to step 522, if the new caching policy is not "no-caching," method 500 may proceed to step 523.

At step 522, host 102*a* may invalidate cache entries for logical unit 114*a* and may set the new caching policy of "no-caching" for logical unit 114*a*, and method 500 may end.

At step 523, host 102*a* may determine if the new caching policy is "read-only." If the new caching policy is "read-only," method 500 may proceed to step 524, if the new caching policy is not "read-only," method 500 may proceed to step 526.

At step 524, host 102*a* may invalidate the cache entries for logical unit 114*a* and set the new caching policy for logical unit 114*a* to "read-only," and method 500 may end.

At step 526, host 102*a* may set the new caching policy for logical unit 114*a* to "write-back," and method 500 may end.

At step 528, depicted in FIG. 5B, the previous cache policy for logical unit 114*a* may have been "write-back" because it may not have been "no-caching," "read-only," or "write-through." Host 102*a* may determine, at step 528, if the new caching policy is "no-caching." If the new caching policy is "no-caching," method 500 may proceed to step 530. If the new caching policy is not "no-caching," method 500 may proceed to step 536.

At step 530, host 102*a* may flush "write-cache" entries for logical unit 114*a*. At step 532, host 102*a* may send storage management module 116 a "write-flush completed" message. At step 534, host 102*a* may invalidate read cache entries for logical unit 114*a* and set the new caching policy for logical unit 114*a* to "no-caching." Following step 534, method 500 may end.

At step 536, host 102*a* may determine if the new caching policy for logical unit 114*a* is "read only." If the new caching policy for logical unit 114*a* is "read-only," method 500 may proceed to step 538. If the new caching policy for logical unit 114*a* is not "read-only"—and, thus, "write-through"— method 500 may proceed to step 544.

At step 538, host 102*a* may flush write cache entries for logical unit 114*a* and send storage management module 116 a "write-flush completed" message at step 540. At step 542, host 102*a* may invalidate the write cache entries for logical unit 114*a* and may set the new caching policy for logical unit 114*a* to "read-only," and method 500 may end.

At step 544, host 102*a* may flush write cache entries for logical unit 114*a* and send storage management module 116 a "write-flush completed" message at step 546. At step 548, host 102*a* may invalidate the write cache entries for logical unit 114*a* and may set the new caching policy for logical unit 114*a* to "read-only," and method 500 may end.

One or more components within hosts 102 may perform the steps described by method 500. Further, modifications, additions or omissions may be made to method 500 without departing from the scope of the disclosure. For example, the order of the steps may be changed, steps may be combined, steps may be performed simultaneously, or steps may be added without departing from the scope of the disclosure.

Although the present disclosure and its advantages have been described in detail, it should be understood that various changes, substitutions and alterations can be made herein without departing from the spirit and scope of the disclosure as defined by the following claims.

What is claimed is:

1. A method comprising:
receiving, by a system management control module, access rights for input/output operations of a host to a logical storage unit, the host communicatively coupled to the logical storage unit;
receiving, by the system management control module, a desired caching policy for locally caching data associated with the logical storage unit and the host;
determining, by the system management control module, an allowable caching policy indicator for the logical storage unit based on the access rights of the host to the logical storage unit, the determination comprising:
comparing access rights of all hosts with access to the logical storage unit to determine whether the host has exclusive access rights to the logical storage unit;
based on a determination that the host has exclusive access rights to the logical storage unit, selecting the allowable caching policy indicator to indicate that local caching is allowable; and
based on a determination that other hosts besides the host have access rights to the logical storage unit, selecting the allowable caching policy to indicate that local caching is not allowable;
setting, by the system management control module, a caching policy for data associated with input/output operations between the host and the logical storage unit, based on at least one of the desired caching policy and the allowable caching policy indicator; and
communicating the caching policy to the host.

2. The method of claim 1, wherein, the allowable caching policy indicator governs conflicts between the desired caching policy and the allowable caching policy indicator.

3. The method of claim 1, further comprising determining whether the desired caching policy is permitted based on the allowable caching policy indicator.

4. The method of claim 3, wherein setting the caching policy includes setting the caching policy to the desired caching policy if the desired caching policy is permitted.

5. The method of claim 1, further comprising changing the caching policy from one of "write-back," "write-through," and "read-only" to "no-caching" in response to the allowable caching policy indicator indicating that caching data associated with input/output operations between the host and the logical storage unit is not permitted.

6. The method of claim 1, further comprising storing on a logical unit access table, by the storage management module, at least one of the access rights and the caching policy of the host with respect to the logical storage unit.

7. A system comprising:
a logical storage unit;
a host communicatively coupled to the logical storage unit; and
a processor communicatively coupled to the host, the processor configured to execute instructions stored on a memory, when executing the instructions the processor configured to:
receive access rights for input/output operations of the host to the logical storage unit;
receive a desired caching policy for locally caching data associated with the logical storage unit and the host;
determine an allowable caching policy indicator for the logical storage unit based on the access rights of the host to the logical storage unit, the determination including:
compare access rights of all hosts with access to the logical storage unit to determine whether the host has exclusive access rights to the logical storage unit;
based on a determination that the host has exclusive access rights to the logical storage unit, select the allowable caching policy indicator to indicate that local caching is allowable; and
based on a determination that other hosts besides the host have access rights to the logical storage unit, select the allowable caching policy indicator to indicate that local caching is not allowable;
set a caching policy for data associated with input/output operations between the host and the logical storage unit, based on at least one of the desired caching policy and the allowable caching policy indicator; and
communicate the caching policy to the host, the host configured to cache data associated with input/output operations between the host and the logical storage unit according to the caching policy.

8. The system of claim 7, wherein the allowable caching policy indicator governs conflicts between the desired caching policy and the allowable caching policy indicator.

9. The system of claim 7, wherein the processor, when executing the instructions, is further configured to determine whether the desired caching policy is permitted based on the allowable caching policy indicator.

10. The system of claim 9, wherein the processor, when executing the instructions, is further configured to set the caching policy to the desired caching policy if the desired caching policy is permitted.

11. The system of claim 7, wherein the processor, when executing the instructions, is further configured to change the caching policy from one of "write-back," "write-through," and "read-only" to "no-caching" in response to the allowable caching policy indicator indicating that caching data associated with input/output operations between the host and the logical storage unit is not permitted.

12. The system of claim 7, wherein the host is configured to cache data associated with input/output operations between the host and the logical storage unit using a non-volatile memory.

13. The system of claim 7, wherein the processor, when executing the instructions, is further configured to store, on a logical unit access table, at least one of the access rights and the caching policy of the host with respect to the logical storage unit.

14. An information handling system comprising:
a network interface communicatively coupled to a host, the host communicatively coupled to a logical storage unit;
a user interface;
a processor communicatively coupled to the user interface and the network interface; and
a non-transitory computer readable medium communicatively coupled to the processor and having stored thereon a program of instructions configured to, when executed by the processor:

receive, from a user via the user interface, access rights for input/output operations of the host to the logical storage unit;
determine an allowable caching policy indicator for the logical storage unit based on the access rights of the host to the logical storage unit, the determination including:
compare access rights of all hosts with access to the logical storage unit to determine whether the host has exclusive access rights to the logical storage unit;
based on a determination that the host has exclusive access rights to the logical storage unit, select the allowable caching policy indicator to indicate that local caching is allowable; and
based on a determination that other hosts besides the host have access rights to the logical storage unit, select the allowable caching policy to indicate that local caching is not allowable;
set a caching policy for data associated with input/output operations between the host and the logical storage unit, based on the allowable caching policy indicator; and
communicate the caching policy to the host via the network interface.

15. The information handling system of claim 14, wherein the computer readable medium is further configured to:
receive, from the user via the user interface, a desired caching policy for caching data associated with the logical storage unit and the host; and
set the caching policy based on the desired caching policy.

16. The information handling system of claim 15, wherein the computer readable medium is further configured to determine whether the desired caching policy is permitted based on the allowable caching policy indicator.

17. The information handling system of claim 16, wherein the computer readable medium is further configured to set the caching policy to the desired caching policy if the desired caching policy is permitted.

18. The information handling system of claim 14, wherein the computer readable medium is further configured to change the caching policy from one of "write-back," "write-through," and "read-only" to "no-caching" in response to the allowable caching policy indicator indicating that caching data associated with input/output operations between the host and the logical storage unit is not permitted.

19. The information handling system of claim 14, wherein the computer readable medium is further configured to store, on a logical unit access table, at least one of the access rights and the caching policy of the host with respect to the logical storage unit.

20. The information handling system of claim 14, wherein the allowable caching policy indicator governs conflicts between the desired caching policy and the allowable caching policy indicator.

* * * * *